United States Patent Office.

GEORGE P. COLE, OF JOHNSTOWN, NEW YORK, ASSIGNOR OF THREE-FOURTHS OF HIS RIGHT TO JEREMIAH KECK, PHILIP KECK, AND POTTER HEDDEN, OF SAME PLACE, ONE-FOURTH TO EACH.

COMPOSITION FOR CLEANSING MARBLE, &c.

SPECIFICATION forming part of Letters Patent No. 234,539, dated November 16, 1880.

Application filed August 11, 1880. (No specimens.)

*To all whom it may concern:*

Be it known that I, GEORGE P. COLE, of Johnstown, in the county of Fulton and State of New York, have invented a certain new and useful Composition for Cleansing Marble and other Valuable Stone of a Similar Nature; and I do hereby declare that the following is a full and exact description of the composition of the same.

The nature of my invention or discovery consists in compounding the following articles in the following proportions, to wit: To two ounces of lime add two ounces whiting, three ounces sal-soda, one-half ounce soft soap, one-fourth ounce fine salt, one-sixth ounce emery-dust, one-half ounce fish-oil, and six ounces of water, thereby forming a composition that will remove moss and weather stains from and thoroughly cleanse marble and other valuable stones of a similar nature.

To prepare the compound I dissolve the sal-soda in the water in the proportions above given and then slake the lime in it, after which add the soft soap, fine salt, emery-dust, whiting, and fish-oil in the proportions above given.

Apply the composition to the marble or other stone of similar nature with a common scrubbing-brush, and let it remain upon the marble or stone until it begins to dry—from one and a half hour to two and a half hours. Then wash it off with a brush and pure water until the composition is entirely removed, and rub the marble or other stone dry with a woolen cloth, leaving the marble or stone in a polished state.

The composition should be kept in a closed tin or other metal package to prevent it from becoming dry, in which condition it cannot be applied so readily and will not absorb or dissolve the dirt and stains so well; but a small quantity of fatty substance is employed, so that the composition will not harden into soap. The fine emery will restore the polish, and the whiting will restore the color to the marble.

I am aware that the several ingredients of my composition have been used before, both separately and in combination with other ingredients; but I am not aware that all of the ingredients of my composition in the proportions stated have been used together previous to my invention.

What I claim as my invention or discovery, and desire to secure by Letters Patent, is—

The composition consisting of lime, whiting, sal-soda, soft soap, fine salt, emery-dust, fish-oil, and water, in the proportions as and for the purpose described.

In testimony that I claim the above I have hereunto subscribed my name in the presence of two witnesses.

GEORGE P. COLE.

Witnesses:
   A. C. FIELD,
   GEO. H. EMPIE.